United States Patent [19]
Chierici et al.

[11] Patent Number: 6,132,199
[45] Date of Patent: Oct. 17, 2000

[54] EQUIPMENT FOR PRODUCING CEREAL BARS ON AN INDUSTRIAL SCALE

[75] Inventors: Antonio Chierici; Daniele Capetta; Enrico Schiaretti, all of Parma, Italy

[73] Assignee: Barilla G.ER.F.LLI - Società per Azioni

[21] Appl. No.: 08/540,926

[22] Filed: Oct. 11, 1995

[30] Foreign Application Priority Data

Dec. 5, 1994 [IT] Italy .................................. MI94A2459

[51] Int. Cl.[7] .............................. A21C 5/04; A21C 7/04; A21C 9/04; B29B 1/06
[52] U.S. Cl. .............................. 425/233; 99/348; 99/353; 99/450.1; 366/76.8; 366/77; 366/93; 425/238; 425/241
[58] Field of Search ................................ 99/348, 352–355, 99/462, 450.1, 494, 485; 366/76.8, 76.7, 77, 93, 143, 69, 71, 72, 74, 160.4, 151.1, 142; 425/233–236, 238–241, 99, 147, 169, 220, 167, 335; 424/195.1, 439; 426/93, 302, 307, 309, 500, 501, 613, 656, 804

[56] References Cited

U.S. PATENT DOCUMENTS

| | | | |
|---|---|---|---|
| 3,733,058 | 5/1973 | Konig | 366/76.8 |
| 3,785,623 | 1/1974 | Konig | 366/76.8 |
| 4,055,669 | 10/1977 | Kelly et al. | 426/93 |
| 4,960,043 | 10/1990 | Van Lengerich | 99/353 |
| 5,102,677 | 4/1992 | Van Den Berghe | 99/348 X |
| 5,158,785 | 10/1992 | Konig | 425/233 |
| 5,227,174 | 7/1993 | Konig | 425/239 X |
| 5,435,714 | 7/1995 | Van Lengerich et al. | 99/450.1 X |
| 5,441,342 | 8/1995 | Konig et al. | 366/76.7 |
| 5,467,693 | 11/1995 | Van Den Berghe | 99/353 |
| 5,486,048 | 1/1996 | Konig et al. | 425/238 X |
| 5,755,152 | 5/1998 | Menzin | 99/353 X |
| 5,846,584 | 12/1998 | Capodieci | 426/238 |

*Primary Examiner*—Timothy Simone
*Attorney, Agent, or Firm*—Pitney, Hardin, Kipp & Szuch, LLP

[57] ABSTRACT

Measured quantities of cereal flakes are loaded into suitable forming moulds in which they are subjected to successive pressure pulses spaced by respective periods in which the pressure is released, so as to compact the cereal flakes, producing cereal aggregates in which the tendency to crumble is considerably reduced.

15 Claims, 9 Drawing Sheets

EQUIPMENT FOR PRODUCING CEREAL BARS ON AN INDUSTRIAL SCALE

FIELD OF THE INVENTION

The present invention relates to a method and equipment for producing cereal aggregates on an industrial scale.

In the description given below and in the following claims, the term cereal aggregate is intended to identify a product without flour and comprising a mixture of cereal flakes and/or expanded extruded cereals and possibly a binding agent, for example, of a sugary type, such as honey in particular, compacted in the form of biscuits, aggregates and the like.

BACKGROUND OF THE INVENTION

It is well known that cereal aggregates are normally required to have suitable organoleptic characteristics such as friability, crispness, an ability to absorb liquids, as well as having a pleasing shape and being easy to work by machine or to handle, that is, being able to withstand all of the mechanical operations provided for after their moulding, for example, such as packaging, without crumbling or requiring the use of special and complex machines or devices for these operations.

Essentially, the production of products of the aforementioned type (cereal aggregates) on an industrial scale provides for the selected cereals to be cooked in water, generally until the starch which they contain has fully gelled, and then to be divided into pieces or pellets which are subjected to a mechanical flaking operation producing the well-known so-called cereal flakes.

Predetermined quantities of cereal flakes are then metered into suitable moulds of predetermined shape and size in which the cereal flakes are compacted producing moist cereal aggregates which are finally dried to produce to the desired biscuits. The cereal flakes are normally compacted with the use of mechanically or hydraulically-operated pressure elements which cooperate with the moulds.

The compacting pressure is selected according to the apparent density and the consistency to be attributed to the finished product (the aggregate).

It is quite gentle when the product is to be particularly light, that is, when a large number and high density of air pockets are to be formed between the cereal flakes constituting it; it must be quite high, however (for example, to reduce the initial volume of the flakes loaded into the respective moulds by half) when a product as free as possible of air trapped between the cereal flakes (an aggregate with a "high" apparent density) is to be produced.

In the former case, to ensure as far as possible that the aggregate can be handled from the moment when it is released from the mould, that is, to combat its tendency to crumble and disintegrate, the cereal flakes have to have a moisture content of 23–30% and have to be mixed with a binding "system" constituted by sugars and fats (of either animal or vegetable origin) in quantities such that fats represent at least 18–25% of the final product.

In the latter case, the flakes must have a moisture content of 6–10% and a reduced quantity of binder to prevent excessive hardness of the finished product.

The present invention relates to a method and equipment for continuously producing cereal aggregates of the second type mentioned above on an industrial scale.

As already mentioned, in order to produce cereal aggregates of relatively "high density", the prior art provides for compacting machines which comprise essentially a cup- or beaker-shaped mould supported in a fixed vertical position, and a piston movable in the mould and constituting the base thereof, the piston cooperating with a mechanically-operated pressure element.

The piston (or movable base) can be positioned in the mould in various ways to define the required quantity of cereals to be compacted; moreover, upon completion of the compacting, it can be used to expel the cereal aggregate produced from the mould.

A first recognized disadvantage of compacting machines of the aforementioned type is that they are wholly inadequate for production on an industrial scale because they operate decidedly intermittently, and also on account of the mechanically imposed limit on the number of "strokes" per minute which the punch-piston pair can carry out without compromising the operation of the machine. In fact, it must be born in mind that, inside the moulds the greater stresses due to the compression stage are withstood by the movable bases and by the lever systems and mechanisms associated therewith.

Another disadvantage is connected with the fact that these compacting machines always require the manual intervention of several operators and/or of special and complex devices for loading the moist cereal aggregates just released from the moulds in an orderly manner onto the conveyor belts of the large tunnel drying ovens normally used in the food industry.

Another disadvantage is connected with the so-called "elastic memory" generally possessed by the quantity or mass of cereal flakes to be compacted; that is, the tendency for the mass to go back to its original volume when the compacting pressure thereon ceases. This "elastic memory" which is due essentially to the intrinsic resilience of the cereal flakes and to the presence of a greater or lesser density of air pockets between them, results in the already-mentioned tendency of the cereal aggregates just produced to crumble.

This tendency is present in most of the cereal aggregates produced by the methods and by the compacting machines of the prior art, even when the compacting pressure is high and/or is maintained for prolonged periods. High compacting pressures give products which are not optimal from an organoleptic point of view, whereas prolonged compacting times adversely affect the productivity of the machines which is already quite poor.

SUMMARY OF THE INVENTION

The problem upon which the present invention is based is that of providing a method of producing, on an industrial scale, cereal aggregates of quite high apparent density and having functional characteristics such as simultaneously to overcome all of the problems mentioned with reference to the prior art.

This problem is solved, according to the present invention, by a method of producing cereal aggregates by compacting cereal flakes in suitable forming moulds, comprising the steps of:

loading a measured quantity of cereal flakes into a corresponding forming mould, exerting on the measured quantity of cereal flakes a plurality of successive pressure pulses spaced by respective periods in which the pressure is released, producing a cereal aggregate, expelling the cereal aggregate thus produced from the forming mould and drying it.

The invention also relates to equipment for implementing the aforementioned method of producing cereal aggregates.

This equipment is characterized in that it comprises:

- a rotary drum advancing in steps ($p_1$) and having a cylindrical shell with a horizontal axis,
- a plurality of cells formed in the thickness of the cylindrical shell in which the cells are arranged in a plurality of rows parallel to the generatrices of the shell and spaced around its periphery by the step ($p_1$), the cells opening in the surface of the shell on one side and being closed by flat bases on the other side,
- a piston guided for moving in each cell for which it constitutes essentially a movable base,
- means for moving all of the pistons of one row of cells simultaneously between retracted positions in contact with their flat bases and positions outside the cylindrical shell,
- a station positioned above the drum for supplying and measuring cereal flakes into the cells,
- a station for compacting the cereal flakes in the cells, positioned beside the drum and comprising a plurality of pressure elements guided for moving radially relative to the cylindrical shell and arranged in a plurality of rows parallel to the generatrices of the shell and spaced apart around its periphery by the step ($p_1$) or by a multiple thereof, the pressure elements of one row of pressure elements being intended simultaneously to engage corresponding cells of a row of cells,
- means for moving the pressure elements of each row simultaneously into and out of the corresponding cells in order to compress and compact the cereal flakes and to produce respective cereal aggregates,
- a station for expelling the cereal aggregates from the cells, positioned beneath the drum and comprising a belt conveyor of a width substantially equal to the lengths of the rows of cells and extending tangentially thereto.

The characteristics and advantages of the invention will become clearer from the detailed description of an embodiment of the method and of the equipment according to the invention given below with reference to the appended drawings given by way of non-limiting example.

DESCRIPTION OF THE PREFERRED EMBODIMENTS

Figure 1:
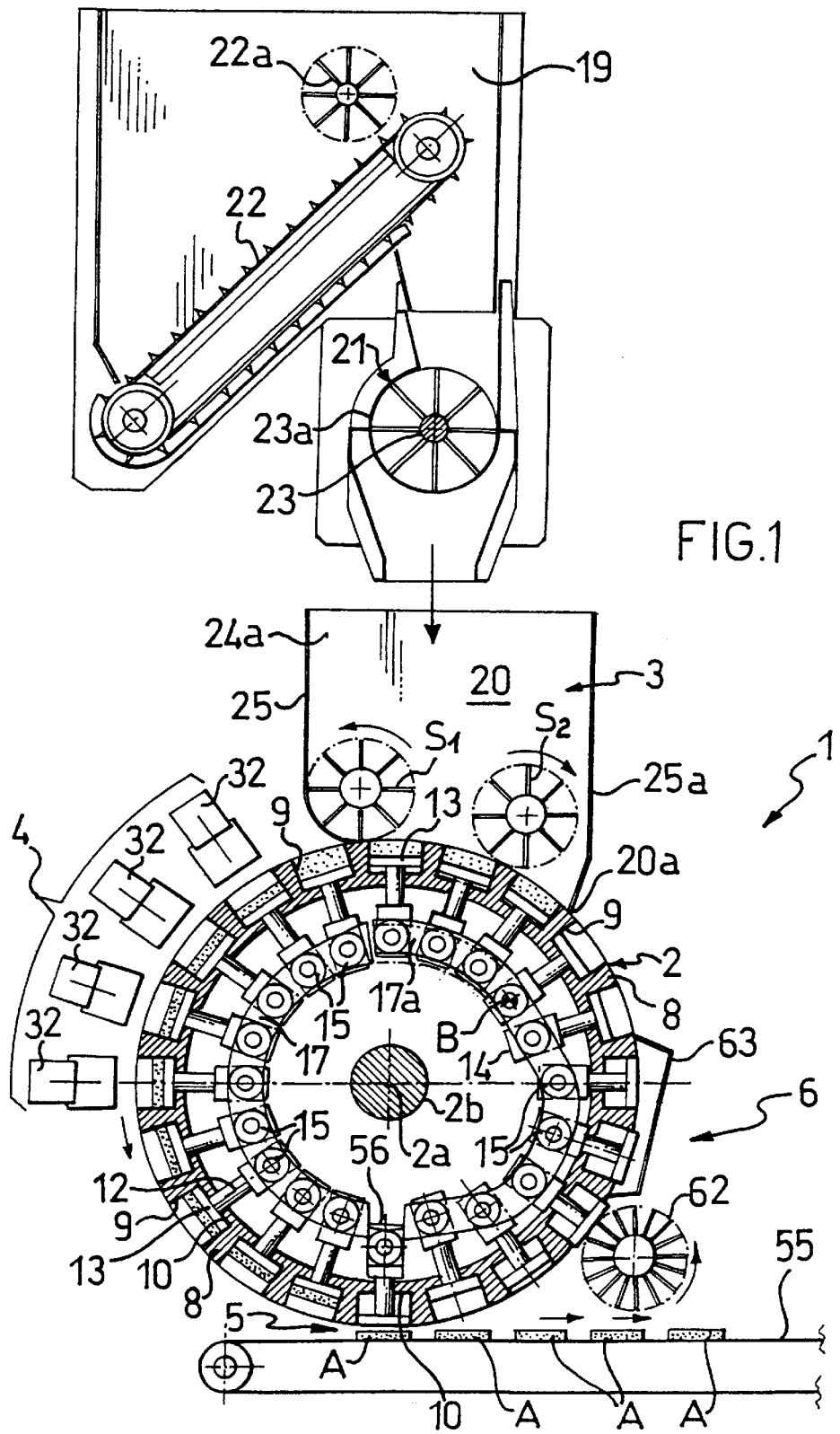
FIG. 1 is a schematic side view of equipment according to the present invention.

With reference to the drawings, equipment for producing cereal aggregates according to the present invention is generally indicated 1.

The equipment comprises a drum 2, with a horizontal axis 2a, supported for rotation by opposed walls 1a–1b of the structure supporting the equipment 1 in a position surrounded by a plurality of operative stations 3, 4, 5 and 6.

In particular, the station 3, which is positioned above the drum 2, is a station for supplying cereals to be compacted, the station 4, which is supported beside the drum 2, is the station for compacting the cereals forming cereal aggregates which are then discharged from the equipment 1 in the station 5 which is positioned beneath the drum 2. The station 6 which is supported beside the drum 2 in a position opposite the compacting station 4 is the station for cleaning and reconditioning the drum 2.

The drum 2 is rotated, advancing in steps ($p_1$) about its own axis 2a. In the embodiment shown, the drum 2 is rotated anticlockwise. For this purpose, the drum 2 is keyed, in conventional manner, to a drive shaft 2b driven by a motor 7 to which it is connected by means of a transmission shaft 7a.

Figure 3:
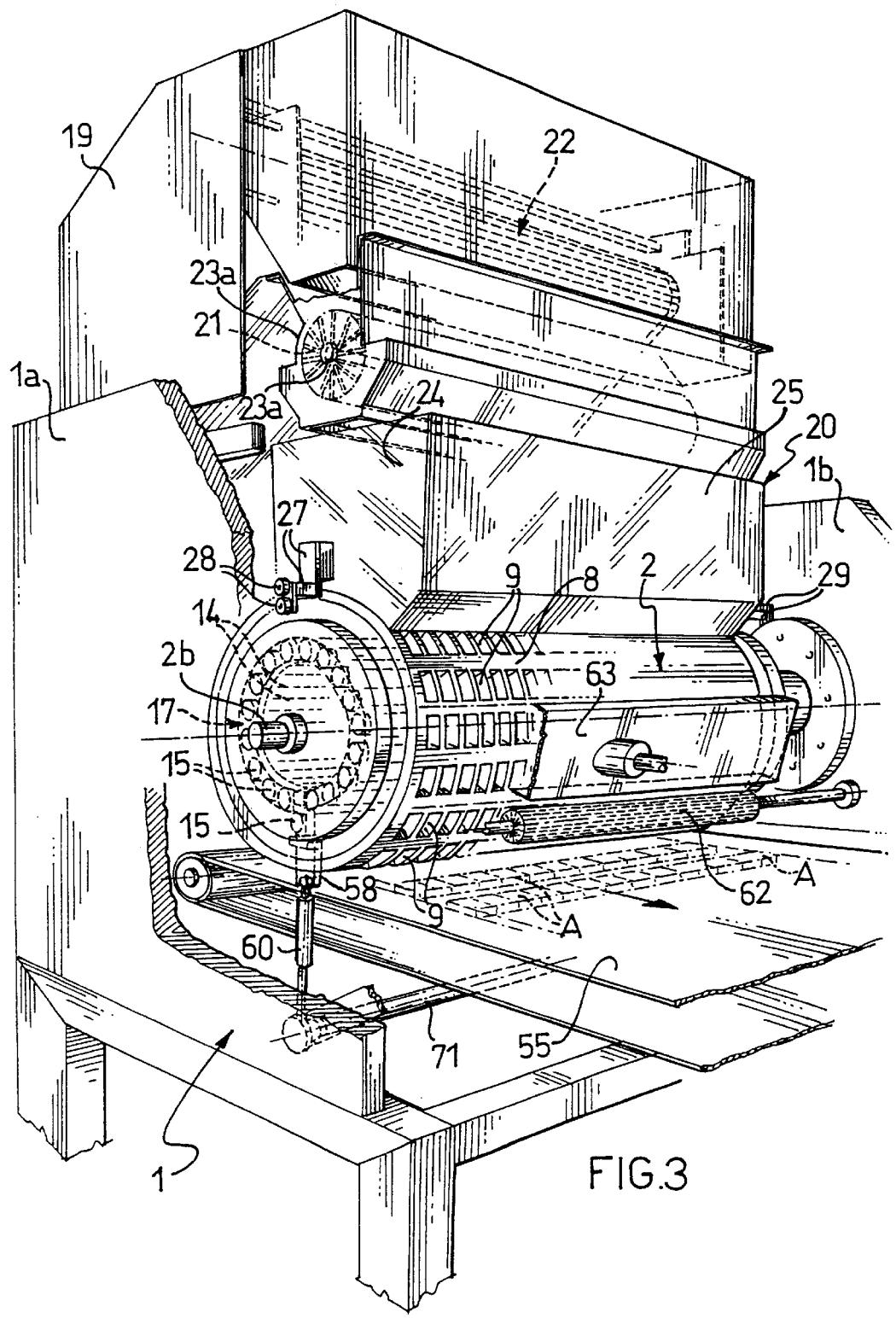
FIG. 3 shows the equipment of FIG. 1 for producing cereal aggregates, schematically and in perspective.
Figure 5:
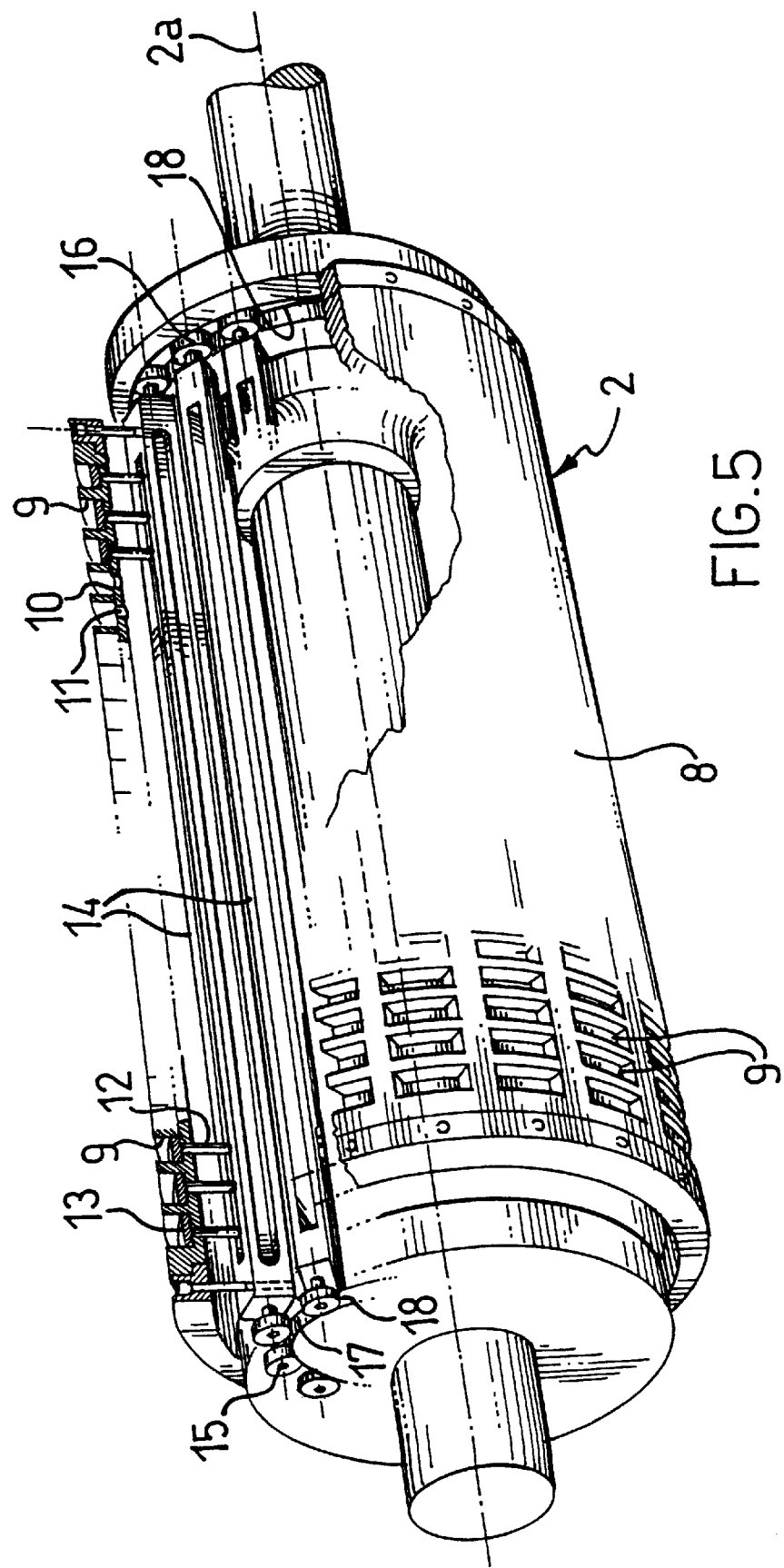
FIG. 5 shows a detail of FIG. 3, in perspective and partially in section.

The drum 2 has a cylindrical shell 8 having a plurality of cells 9 all of which are identical and which are arranged in equal numbers in a corresponding plurality of rows parallel to the generatrices of the shell 8 (FIGS. 3 and 5), the rows being spaced apart angularly by the step ($p_1$) around the entire periphery of the shell 8.

In the embodiment shown, the cells 9 are formed in the thickness of the shell 8 and are of a parallelepipedal shape corresponding to that of the biscuits or cereal aggregates to be produced; in the embodiment shown, they are rectangular in plan with the short side parallel to the generatrices of the shell.

Figure 4:
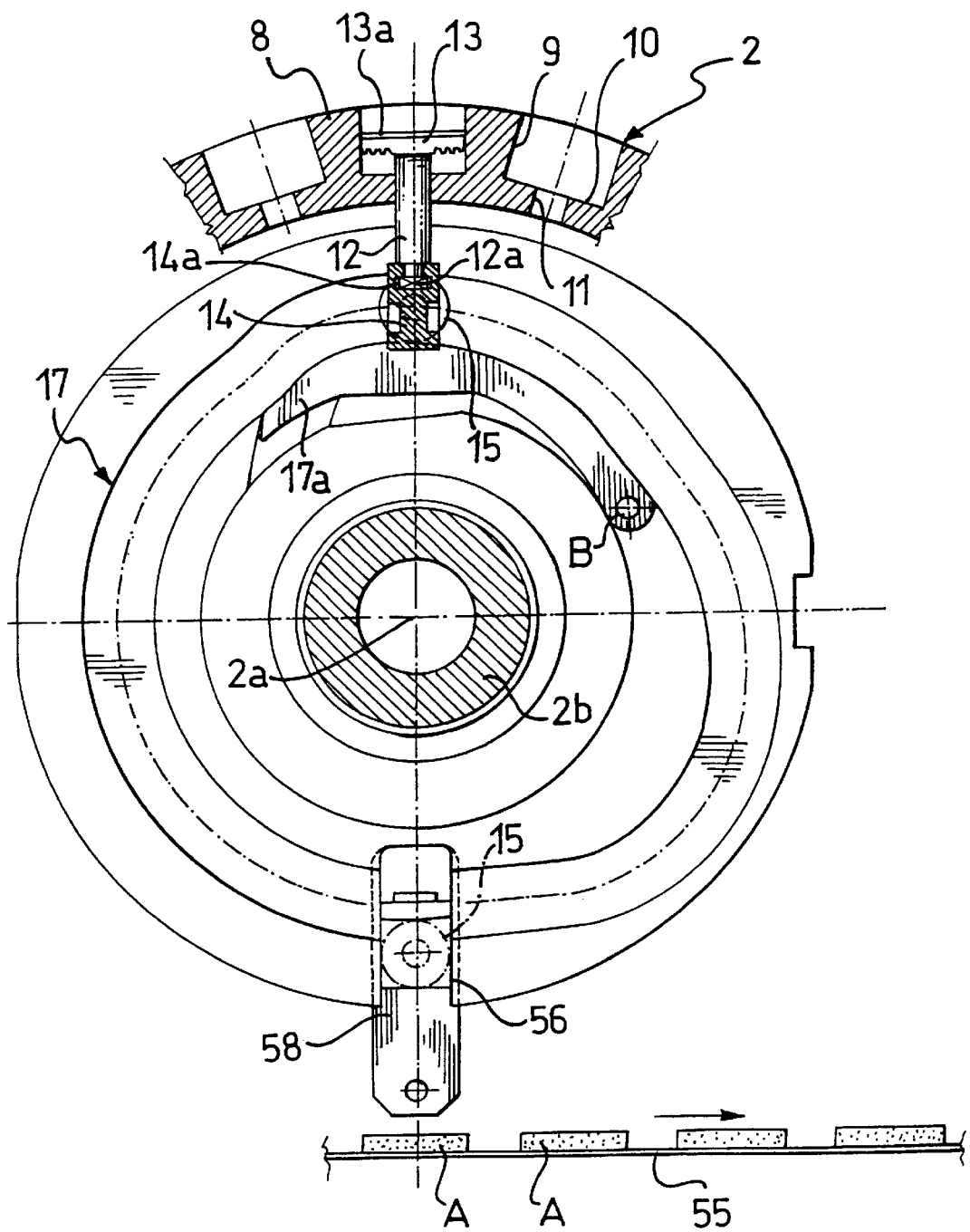
FIG. 4 shows some structural details of the equipment of FIG. 1, on an enlarged scale.

Each cell 9 (FIG. 4) opens in the outer surface of the shell 8 on one side and is closed by a flat base 10 on the opposite side. The base 10 has a central through hole 11 in which the rod 12 of a parallelepipedal, flattened piston 13 with a flat head 13a is guided for sliding. The piston 13 has a shape matching that of the cell, in which it cannot rotate but is guided for moving (in a radial direction relative to the shell 8) by the side walls of the cell for which it constitutes essentially a movable base.

The rod 12 extends radially into the drum 2.

The rods 12 of the pistons 13 of each individual row of cells 9 have ends 12a disposed inside the drum 2 and removably engaging a respective bar 14 which extends through the drum parallel to the axis 2a thereof, in a position between this axis and the inner surface of the cylindrical shell 8.

The engagement of each rod 12 with the respective bar 14 is advantageously of the bayonet type; for this purpose, the bar 14 has a T-shaped longitudinal groove 14a and the ends 12a of the rods 12 are also correspondingly T-shaped, the rods being of a length such that they are still engaged with the groove 14a when the respective pistons 13 are fully outside the cells 9.

Each bar 14 has respective wheels 15 and 16 at its opposite ends outside the drum 2 (FIG. 6) and engaged for rolling in corresponding substantially annular guides 17, 18 formed with cam profiles, as will become clear from the following description.

Figure 7:
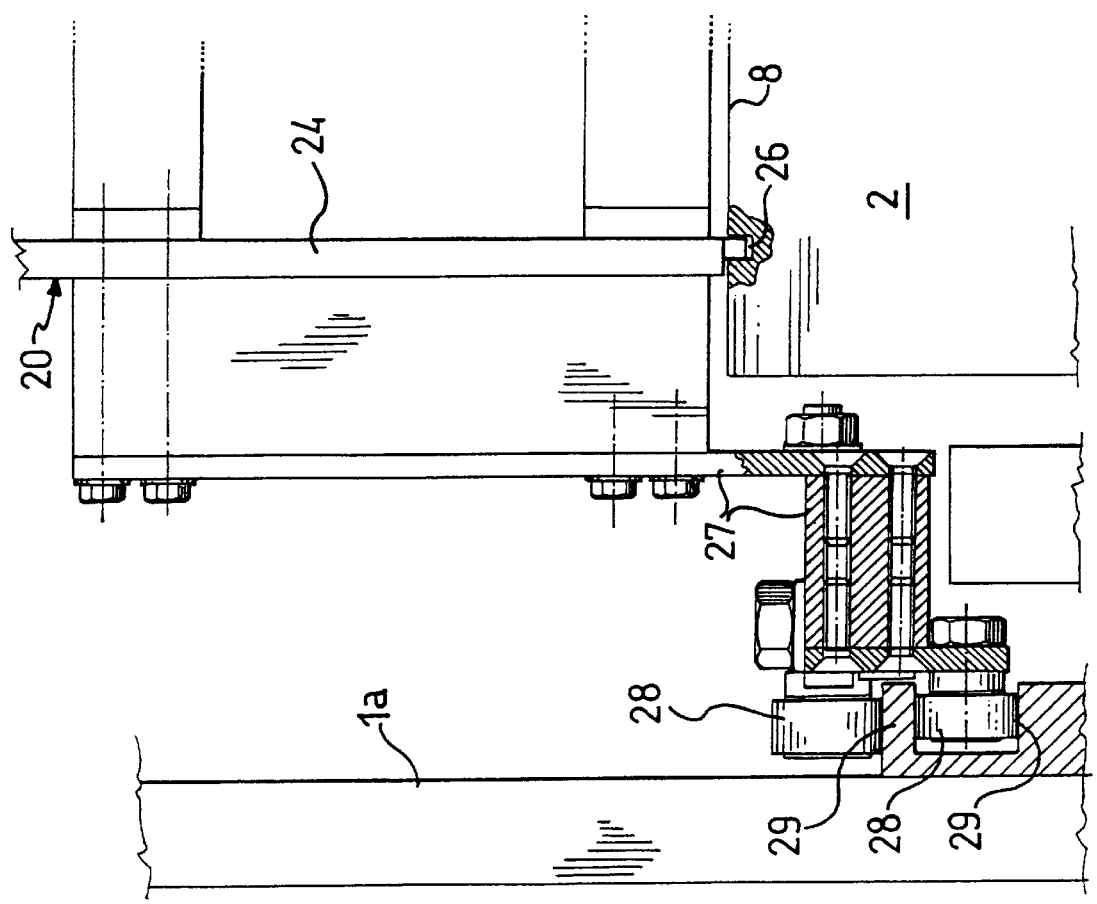
FIGS. 7 and 8 show respective details of the equipment of FIG. 2, on an enlarged scale.

The guides 17, 18 are structurally independent of the drum 2 and are supported by the opposed walls 1a–1b of the equipment 1 which are arranged transverse the axis 2a of the drum 2 (FIG. 7).

The station 3 for supplying the cereals comprises a cereals tank 19 with an open top and a hopper 20 which communicates with the tank 19 via a crumbling device 21 on one side and opens onto the cellular shell 8 of the drum 2 on the other side. By way of example, the crumbling device 21 comprises a vaned bar 23 rotating in an open-topped cylinder 23a of perforated sheet metal.

According to this preferred embodiment (FIG. 1), the crumbling device 21 is therefore in communication with the cereals tank 19 near the top thereof.

The cereals are brought to the crumbling device 21 by means of a belt conveyor 22 acting in the tank 19 in which it extends obliquely upwards from the bottom thereof and cooperates with a stripper device with a rotating bar 22a. On the other side, the crumbling device 21 communicates with the hopper 20 through the perforated metal sheet 23a.

The hopper 20 is preferably constructed substantially like a pyramid frustum, being rectangular in plan with shorter walls 24, 24a transverse the axis 2a of the drum 2 and longer walls 25, 25a extending longitudinally of the drum.

The hopper consequently has a rectangular supply opening 20a with long sides extending along the entire lengths of the rows of cells 9 and a width such as to be disposed above, for example, three adjacent rows of cells.

In a preferred embodiment, the hopper 20 can advantageously pivot about the axis of the drum 2 so as to advance simultaneously with the drum and then return to the initial position when the drum is stationary. In particular and advantageously, the hopper 20 advances at a slower speed than the drum 2 and for the same time.

The existence of relative movement between the drum 1 and the hopper 20 even during their advance gives rise to a "scraping" effect on the outer surface of the shell 8 by means of the longer walls 25, 25a of the hopper which may have suitable lower lip-like appendages.

With reference to FIG. 7, a carriage 27, 27a fixed to each of the transverse walls 24, 24a of the hopper 20 at an appropriate height extends along a circular arc coaxial with the drum 2 and comprises a plurality of pairs of wheels 28, 28a engaging respective curved guides 29, 29a fixed to the walls 1a–1b of the equipment 1.

Figure 9:
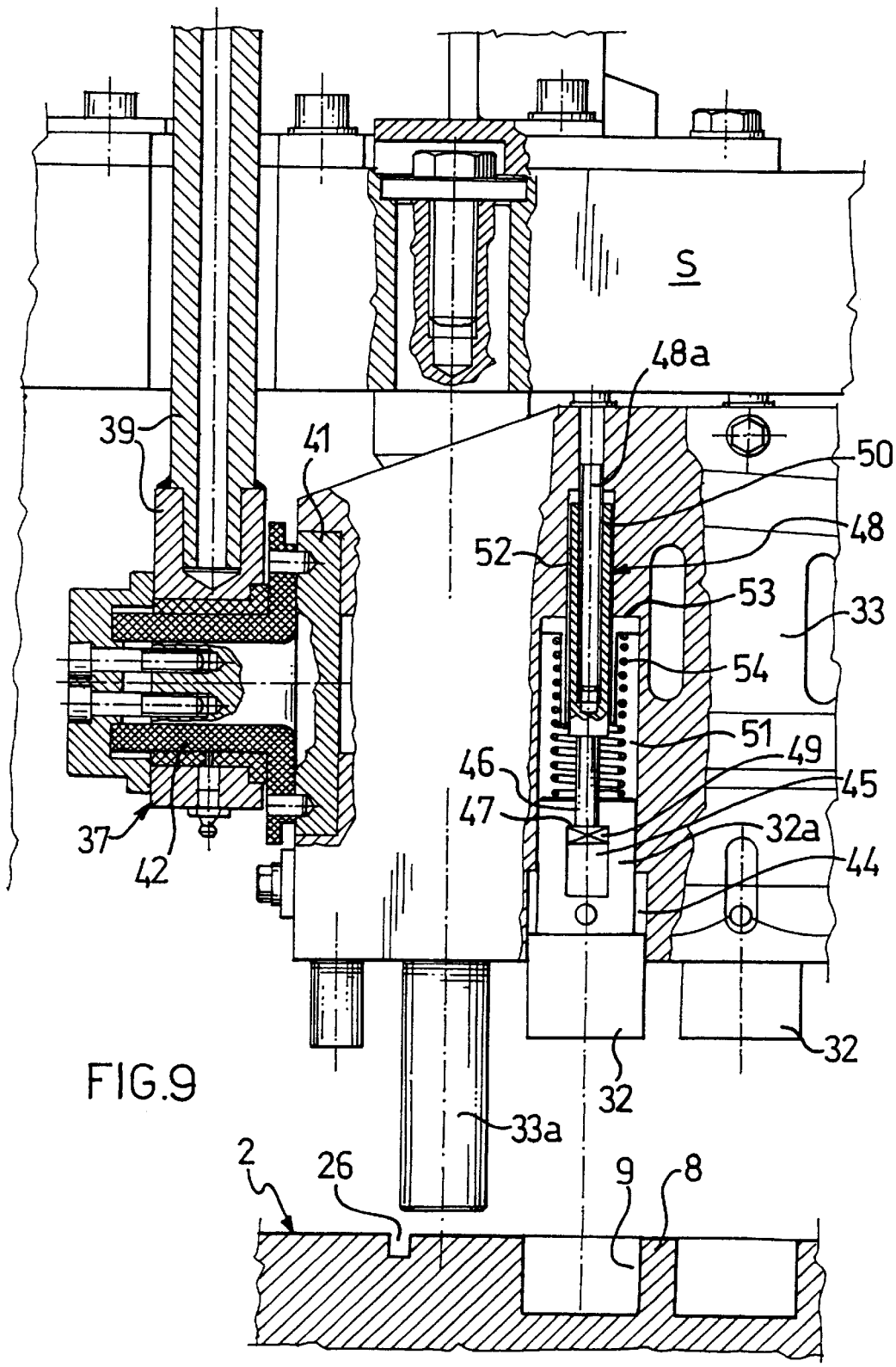
FIG. 9 shows a detail of FIG. 8 on a further enlarged scale.

To prevent loss of cereal flakes between the drum and the hopper during the pivoting of the hopper 20, its transverse walls 24, 24a are engaged slidingly and guided in respective peripheral grooves 26, 26a (FIG. 9) in the shell 8.

Figure 2:
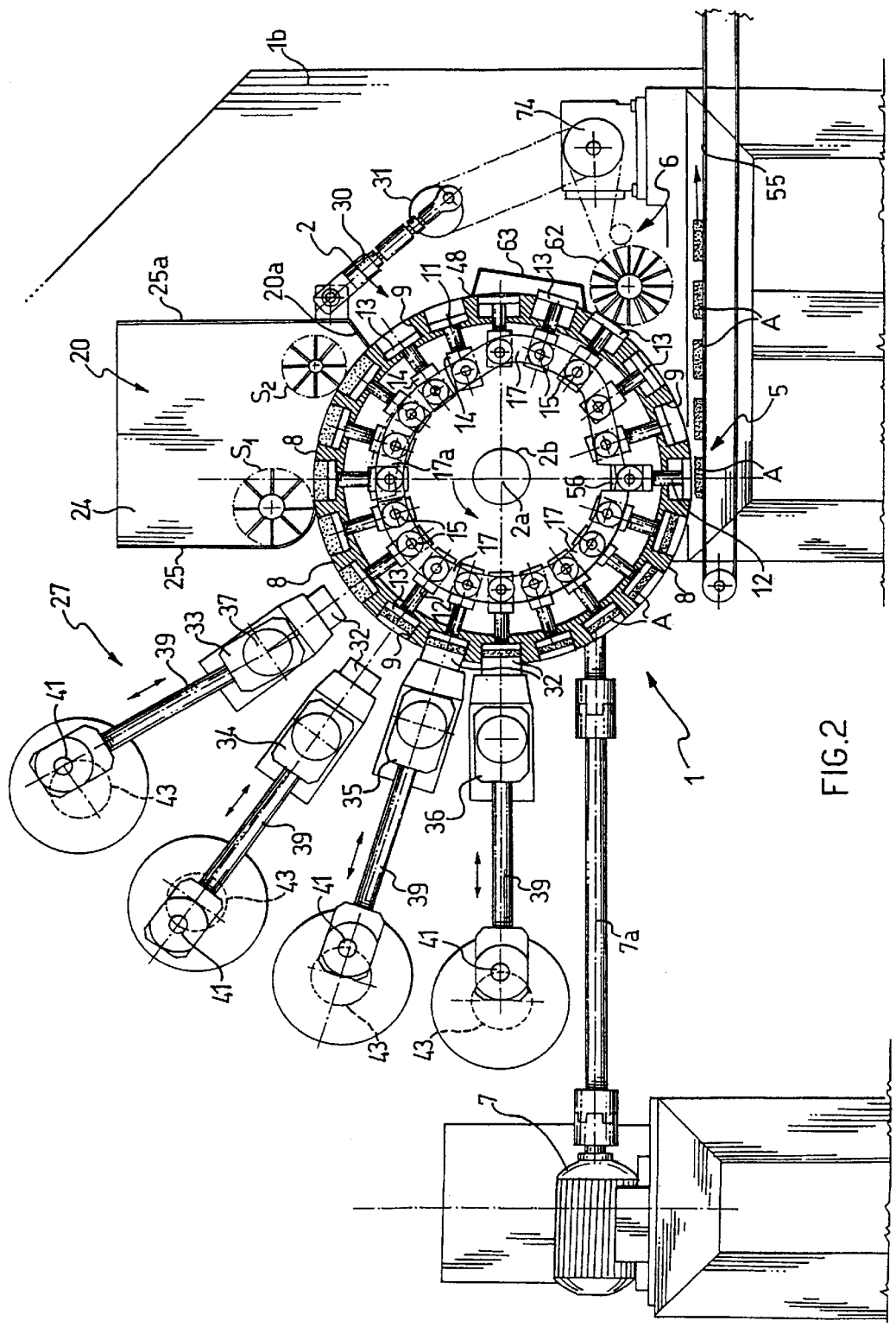
FIG. 2 shows the equipment of FIG. 1 schematically and partially in section.

A connecting-rod-and-crank system 30–31 provides the hopper 20 with the required pivoting motion (FIG. 2).

It should be noted that two suitable motor-driven brushes S1, S2 are supported for rotation in the hopper 20 near its cereal-supply opening 20a and extend along the entire length of the longitudinal walls 25, 25a thereof.

The station 4 for compacting the cereal flakes in the cells 8 comprises a plurality of pressure elements 32 distributed in rows parallel to the generatrices of the cellular shell 8.

In the embodiment shown, there are four rows of pressure elements 32, the rows being spaced apart angularly and peripherally by one step ($p_1$).

The pressure elements 32 of each row are guided for moving (in the manner described below) towards and away from the cellular shell 8 in a radial direction relative thereto, to engage slidingly and removably in respective cells 9 of a corresponding row of cells, the pressure elements 32 having cross-sections matching those of the cells 9.

All of the pressure elements 32 of each row of pressure elements are mounted on a single bar 33 which extends parallel to the generatrices of the cellular shell 8 and spaced therefrom.

Figure 8:
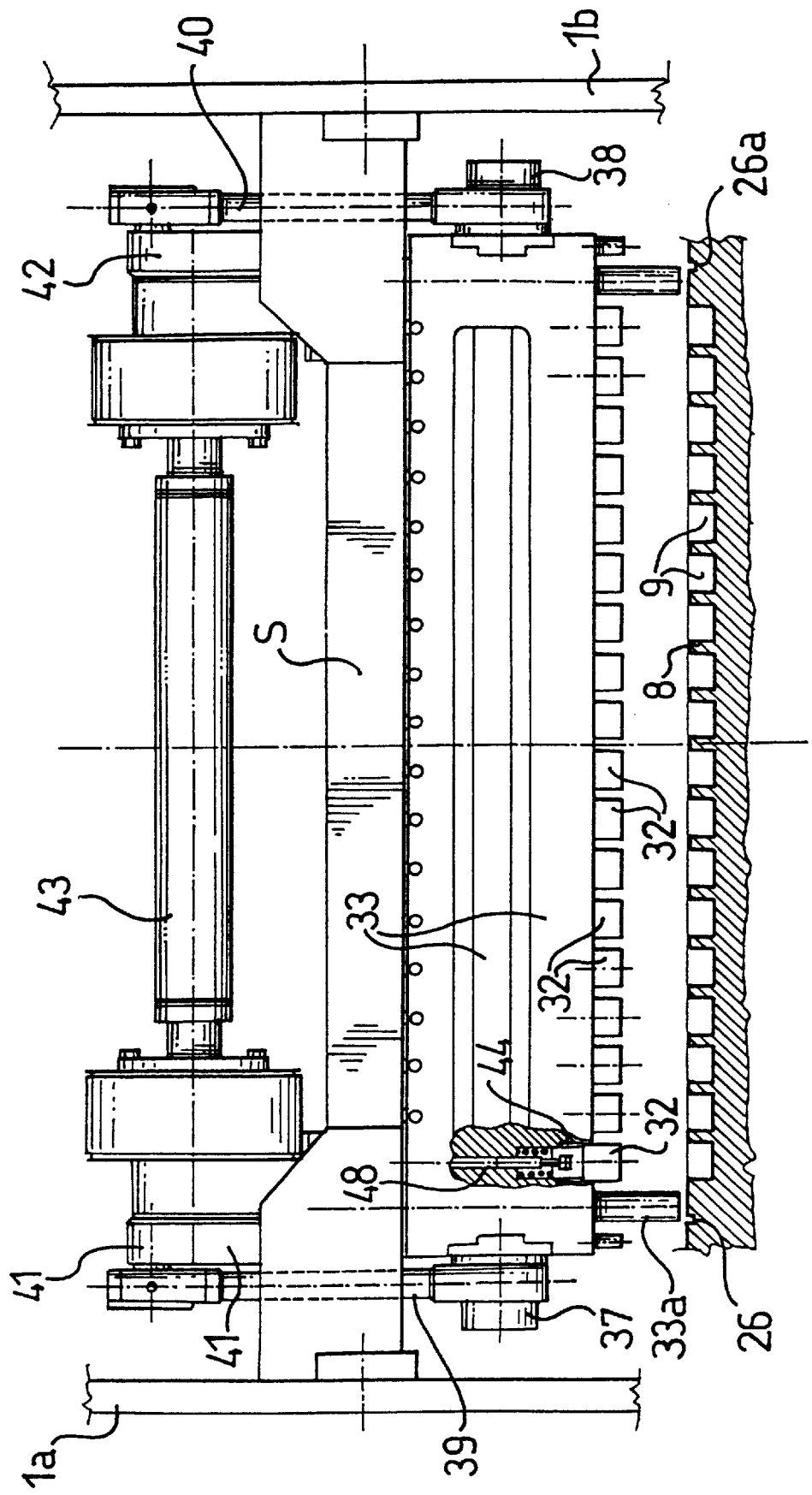

The pressure-element support bar 33 (FIGS. 8 and 9) has opposite ends 37, 38 which are constructed like hubs (or have respective hubs) engaged for rotation in respective ends of connecting rods 39, 40 and guided for sliding by guides 33a extending radially relative to the cellular shell 8 (the guides being supported in a wholly conventional manner not shown, for example, by a beam S of the equipment 1).

The connecting rods 39, 40 are driven by respective cranks 41, 42 mounted in known manner, not shown, on the ends of a corresponding motor-driven shaft 43 which is supported for rotation by the walls 1a–1b of the equipment 1 by means of the beam S and extends parallel to the axis 2a of the drum 2.

The bar 33 has a plurality of seats 44 (one for each pressure element 32 of one row of pressure elements), of shapes and sizes matching those of the respective pressure elements 32 which have to be housed and guided slidingly by the seats.

Advantageously, a resilient load of adjustable magnitude acts on each pressure element 32. For this purpose, according to a preferred but not exclusive embodiment shown in FIG. 9, each pressure element 32 has a shank 32a in which there is a blind hole comprising a first portion 45 with a square cross-section and a second portion 46 with a circular cross-section, a shoulder 47 being defined between the portions 45, 46.

A tension rod, generally indicated 48, has a square head 49 at one end and an axial, threaded, blind hole 50 extending from its other end.

The threaded hole 50 is engaged by a screw 48a for adjustably varying the position of the tension rod 48.

The square head 49 of the tension rod 48 is engaged slidingly in the square-holed portion 45 of the shank 32a and the tension rod itself is engaged slidingly in the circular portion 46.

The seat 44 for housing the pressure element 32 constitutes the end portion of a through-hole with several portions 44, 51, 52 extending through the bar 33 in a radial direction relative to the shell 2.

The portion 51 which opens into the seat 44 has a cross-section matching that of the shank 44 of the pressure element 32 and the portion 52 which opens into the portion 51, with which it defines a shoulder 53, is intended to house the tension rod 48.

A spring 54 positioned in the portion 51 of the through hole bears against the shoulder 53 at one end and against the shank 32a of the pressure element 32 at the other end.

It is consequently possible to vary the resilient load exerted on the respective pressure element 32 by the spring 54, in an adjustable manner, by the operation of the screw 48a.

According to a preferred embodiment, it is also possible to vary the extent to which the pressure element 32 is inserted in the respective cell.

For this purpose, the opposite ends of the bar 33 have eccentrics 41, 41a which can be moved angularly (around the axis of the bar 33) by means of a manually operated "key" or other similar tool 42.

The appended drawings show four bars 33, 34, 35, 36, one for each of the four rows of pressure elements 32, all of the bars being identical to and constructed in the same way as the bar 33 described above.

In the station 5 there is a conveyor 55 with a horizontal belt extending perpendicular to the axis of the drum 2 and having a width at least equal to the lengths of the rows of cells 9 of the drum so as to receive thereon an entire row of cereal aggregates A discharged simultaneously from the equipment 1.

For this discharge operation, the station 5 has a device for simultaneously expelling the aggregates A from the respective cells 9 of each individual row which is in the station.

According to a preferred embodiment (FIGS. 3, 4 and 6), this device comprises identical and opposed sectors 56, 57 of the cam guides 17, 18 which are structurally independent of the respective guides and are movable transversely relative thereto.

The sectors 56, 57 are aligned in a direction parallel to the axis of the drum 2 and have widths such as to accept solely the respective wheels 15, 16 of one and the same bar 14.

In particular, and preferably, the movable sectors 56, 57 are on the vertical line extending through the axis 2a of the drum 2 and have respective vertical lugs 58, 59 extending outwardly of the cellular shell 8.

Figure 6:
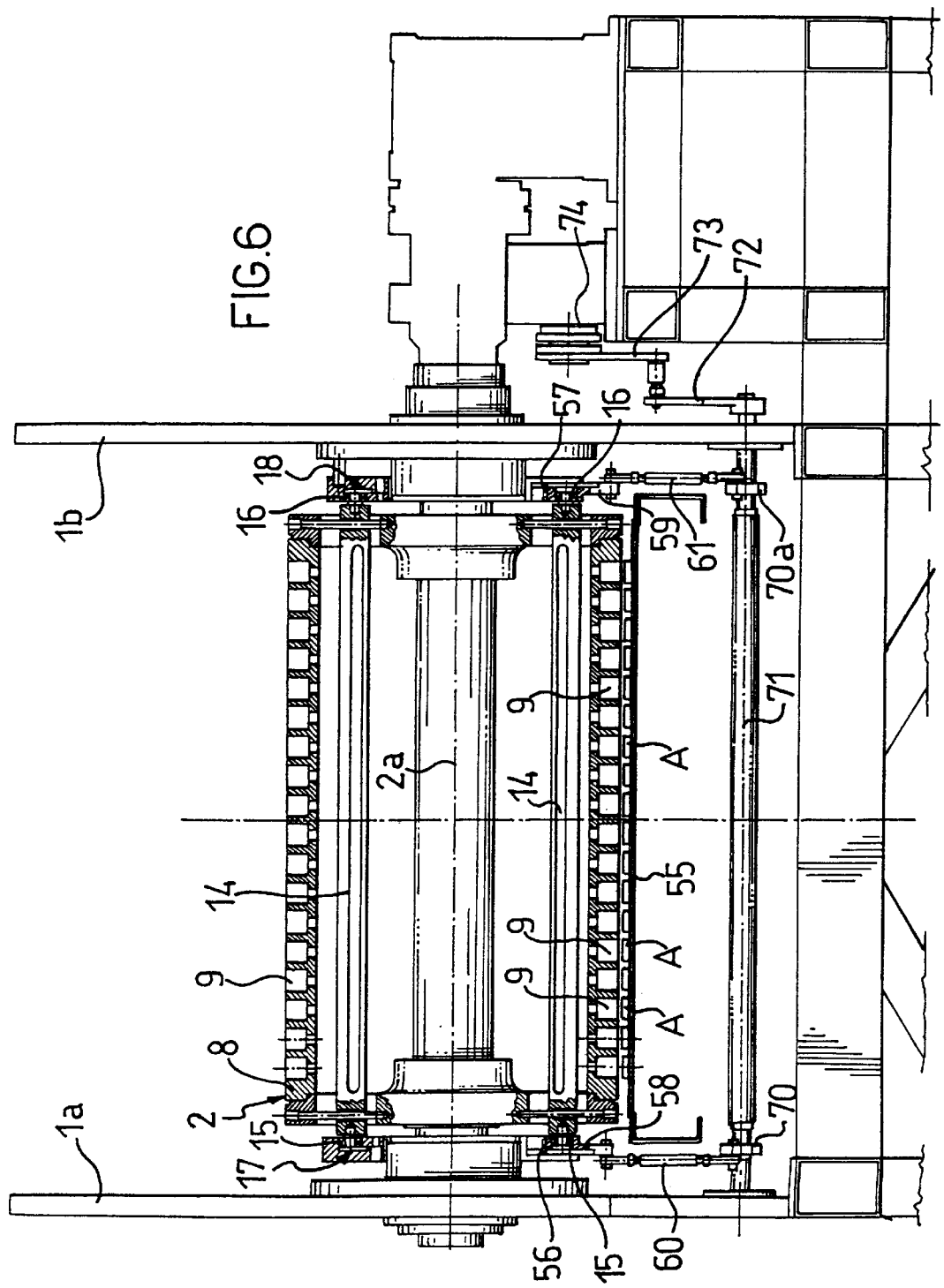
FIG. 6 is a longitudinal, axial section of the equipment of FIG. 2, on an enlarged scale.

The lugs 58, 59 are connected to respective tie rods 60, 61 which are connected by means of conventional lever systems, shown schematically in FIG. 6 and indicated 70, 70a, 71, 72, 73, to a motor 74 in order to be moved simultaneously in one direction and in the opposite direction.

The sectors 56, 57 and the bar 14 engaged thereby can thus be moved away from the respective cam guides 17, 18 towards the cellular shell 8 and can then be returned to their starting positions.

The magnitudes of these movements are selected so that when the sectors 56, 57 are in the position in which they have been moved away from the respective cam guides 17, 18, the pistons 13 carried by the corresponding bar 14 are in positions in which they emerge on the surface of the cellular shell 8.

In the station 6 for cleaning and reconditioning the machine, the cam guides 17, 18 have profiles such as to cause the bars 14 to move towards the cellular shell 8 until the pistons 13 carried thereby project from the corresponding cells 9.

The station 6 comprises, in the order in which they are passed, a rotary brush 62 extending along the entire length of the cellular shell 8, and a suction hood 63.

The suction hood 63 is connected to a suction system, not shown, in order to draw off any particles of cereals which remain even after the operation of the rotary brush 62. In particular, the suction system brings about a swirling movement of air inside the cells even beneath the pistons 13 so as to remove any particles of cereals present on the piston rods 12.

The operation of the equipment according to the invention will now be described, again with reference to the appended drawings.

The drum 2 is rotated about the horizontal axis 2a by means of the motor 7, and advances anticlockwise in steps (p).

The connecting-rod-and-crank system 30–31, driven by a suitable motor, not shown, causes the hopper 20 to "pivot" about the axis 2a of the drum 2 with reciprocating angular movements of an amplitude equal to one half step (p/2) of the advance of the drum between a "retracted" position relative to the compacting station 4 and an "advanced" position close to the station 4.

In the "advanced" position, the hopper 20 covers the row of cells 9 immediately preceding that currently under the first row of pressure elements 32.

The forward angular movement (the advance) of the hopper 20 is effected simultaneously with the advance of the drum 2 by one step (p).

The hopper 20 is retracted when the drum 2 is stationary, or rather in the pause between two successive steps (p) in the advance of the drum 2.

In an initial condition, the drum 2 is stationary and the hopper 20 is in the retracted position; in the cells 9 of the four rows "covered" by the hopper 20, the cam guides 17, 18 keep the respective pistons 13 in predetermined positions according to the desired quantity of cereals to be loaded into the cells.

In this connection, it should be noted that, in order to be able to vary the quantity of cereals without the need to replace the cam guides 17, 18 with other more suitable ones, the upper portions 17a–18a of the cam guides 17, 18 (that is, the portions extending adjacent the hopper 20 and throughout the width thereof) are constituted by respective portions which are structurally independent of the guides themselves.

These portions 17a–18a are hinged on the respective cam guides 17, 18 with hinge axes B parallel to the axis 2a of the drum 2 and are movable angularly relative to the guides in order to vary the corresponding cam height (in an adjustable manner).

The counter-rotating brushes S1, S2 inside the hopper 20 and near the longitudinal walls thereof cooperate effectively in the measuring of the cereals into the cells 9.

These brushes in fact have the task of scraping the surfaces of the contents of the cells 9 so as to send cells 9 with predetermined quantities of cereals to the compacting station 4.

In view of the fact that all of the rows of cells 9 are identical both structurally and functionally, the following description refers to a single row of cells.

As they pass through the compacting station 4, the cereals in each individual cell 9 are subjected, step by step, to the action of the pressure elements 32 of the four rows of pressure elements of the station. Essentially, the cereals are subjected to a plurality (four) of successive pressure pulses with intervals in which the pressure is released.

It should be noted that the pressure exerted by the individual rows of pressure elements 32 can be varied at will from row to row simply by varying the positions of the pressure elements 32 inside the respective seats 44. For example and in particular, whereas the pressure elements of the bars (rows) 33 and 34 exert the same pressure, the pressure elements of the bar 34 are positioned in the respective seats in a manner such as to exert a greater pressure and the pressure exerted by the pressure elements of the bar 36 will be further increased.

It is thus possible to cancel out the effect of the so-called "elastic memory" of the cereal flakes, that is, the tendency of the aggregate produced to go back to the volume which it had initially inside the respective cell.

The pause (with the drum 2 stationary) between one compression and the next also seems to play an effective part in achieving this advantageous result.

It should be noted that when the first pressure pulse takes place, the pistons 13 of the individual cells 9 of a row of cells are "moved" towards the bases of the respective cells 9 so as to bear against them, after which the compacting "pressure" is born by the drum 2 and by its supports and not by mechanisms and kinematic devices associated with the pistons 13. This is a considerable mechanical and functional advantage achieved by the present invention.

As the drum 2 continues to rotate, the cells 9 of the row in question reach the discharge station 5, and with them, of course, the respective bar 14 which supports the pistons 13 engaged in the cells.

When the opposed wheels 15, 16 of the bar 14 have engaged the respective sectors 56, 57 of the cam guides 17, 18, and when the drum 2 has stopped temporarily for the time (the pause) provided for between two successive steps forward, the crank mechanism is operated and brings about the downward movement of the sectors 56, 57 and then their return to their starting positions, substantially without discontinuity.

The bar 14, and with it all of the pistons 13 of the row of cells 9 in question, are also moved with the sectors 56, 57.

The movement towards the shell 8 of the pistons 13 in the respective cells 9 which are momentarily stationary, results in the pistons emerging on the surface of the cellular shell 8 with the consequent simultaneous expulsion of all of the cereal aggregates previously compacted in the cells.

Thus, for each forward step ($p_1$) of the drum 2, a row of compacted cereal aggregates is formed on the belt conveyor disposed beneath the station 5 and is then advanced towards a drying oven, not shown.

In this connection, it should be pointed out that the equipment of the present invention forms, on the conveyor 55, successive and uniform rows of a predetermined number of aggregates A which are spaced evenly at predetermined intervals and are thus well aligned and can continue as they are towards the drying oven and then towards the packaging machines.

This avoids the intervention of operators and/or devices for arranging the aggregates on the conveyor in an orderly manner as is currently required by equipment of the prior art in which the aggregates emerge from the compacting machines in a single row (in Indian file).

After suitable cleaning in the station 6, the row of cells in question is ready for new quantities of cereals to be compacted and is thus ready to recommence the cycle described above.

We claim:

1. Equipment for producing cereal aggregates by compacting cereal flakes in suitable moulds comprising:

a rotary drum advancing in steps and having a cylindrical shell with a horizontal axis, a plurality of cells formed in the thickness of the cylindrical shell in which the cells are arranged in a plurality of rows parallel to the generatrices of the shell and spaced apart around its periphery by the step, the cells opening in the surface of the shell on one side and being closed by flat bases on the other side, a piston guided for moving in each cell for which it constitutes essentially a movable base, means for moving all of the pistons of one row of cells simultaneously between retracted positions in contact with their flat bases and positions outside the cylindrical shell, a station positioned above the drum for supplying and measuring cereal flakes into the cells, a station for compacting the cereal flakes in the cells, positioned beside the drum and comprising a plurality of pressure elements guided for moving radially relative to the cylindrical shell, arranged in a plurality of rows parallel to the generatrices of the shell and spaced apart around its periphery by the step, the pressure elements of one row of pressure elements being intended simultaneously to engage corresponding cells of a row of cells, means for moving the pressure elements of each row simultaneously into and out of the corresponding cells in order to compress and compact the cereal flakes and to produce respective cereal aggregates, a station for expelling the cereal aggregates from the cells, positioned beneath the drum and comprising a belt conveyor of a width substantially equal to the lengths of the rows of cells and extending tangentially thereto.

2. Equipment according to claim 1, wherein the piston has a rod engaged slidingly in a central hole in the flat base of the respective cell, the rod extending radially relative to the cylindrical shell and inwardly thereof.

3. Equipment according to claim 2, wherein all of the rods of the plurality of pistons of each row of cells have their ends which are inside the shell engaged removably in a single support bar which extends parallel to the axis of the drum and is subservient to the means for moving the pistons.

4. Equipment according to claim 3, wherein, at its opposite ends, the bar has wheels engaged for rolling in respective substantially annular cam guides supported and fixed externally on each side of the drum and substantially coaxial with the cylindrical shell.

5. Equipment according to claim 4, wherein, in the supply station, the cam guides have respective portions of variable cam height in order, when necessary, to vary the positions of all of the pistons inside the corresponding cells, according to the predetermined quantity of cereal flakes to be loaded therein.

6. Equipment according to claim 4, wherein, in the station for expelling the aggregates, the cam guides comprise respective portions which are structurally independent thereof and are guided for moving radially relative to the cylindrical shell, the portions of the cam guide being of a width suitable for accepting the opposed wheels of the same bar, means being provided for moving the portions from a position of alignment with the respective cam guides to a position in which they are moved away therefrom so as to move the pistons of the bar outwardly relative to the respective cells and to expel the cereal aggregates formed therein onto the belt conveyor.

7. Equipment according to claim 1, wherein the supply station comprises a hopper with a substantially rectangular supply opening which opens onto the cylindrical shell and has long sides extending along the entire length of the rows of cells and short sides extending transverse the rows.

8. Equipment according to claim 7, wherein the opening of the hopper has opposed short sides slidingly engaged in respective annular peripheral grooves in the cylindrical shell.

9. Equipment according to claim 7, wherein the hopper is supported for pivoting relative to the drum.

10. Equipment according to claim 7, wherein the hopper is of a width such as to span a plurality of rows of cells.

11. Equipment according to claim 1, wherein all of the pressure elements of each row of pressure elements are mounted on the same pressure-element-support bar which extends parallel to the generatrices of the cylindrical shell and has opposite ends engaged slidingly in respective guides extending radially relative to the shell.

12. Equipment according to claim 11, wherein the means for simultaneously moving all of the pressure elements of the same pressure-element-support bar into and out of the corresponding cells comprise two identical connecting-rod-and-crank assemblies having respective connecting-rod ends associated with the opposite ends of the bar.

13. Equipment according to claim 11, wherein the pressure elements are mounted in respective seats in the pressure-element-support bars, in which they are subjected to respective resilient loads.

14. Equipment according to claim 13, wherein the pressure elements are positioned adjustably in the respective housing seats with the opposition of resilient means.

15. Equipment according to claim 1, which also comprises a station for cleaning and reconditioning the shell, the cells and respective pistons associated therewith.

\* \* \* \* \*